(12) United States Patent
Villwock et al.

(10) Patent No.: US 9,222,226 B2
(45) Date of Patent: Dec. 29, 2015

(54) DEVICE FOR DETECTING THE MOTION OF A COMPACTOR ROLLER OF A SOIL COMPACTOR

(71) Applicant: HAMM AG, Tirschenreuth (DE)

(72) Inventors: Sebastian Villwock, Pechbrunn (DE); Werner Völkel, Neustadt (DE)

(73) Assignee: HAMM AG, Tirschenreuth (DE)

( * ) Notice: Subject to any disclaimer, the term of this patent is extended or adjusted under 35 U.S.C. 154(b) by 0 days.

(21) Appl. No.: 14/364,666

(22) PCT Filed: Dec. 13, 2012

(86) PCT No.: PCT/EP2012/075415
§ 371 (c)(1),
(2) Date: Jun. 11, 2014

(87) PCT Pub. No.: WO2013/087783
PCT Pub. Date: Jun. 20, 2013

(65) Prior Publication Data
US 2014/0341650 A1    Nov. 20, 2014

(30) Foreign Application Priority Data
Dec. 14, 2011  (DE) .......................... 10 2011 088 567

(51) Int. Cl.
*E01C 19/23* (2006.01)
*E02D 3/026* (2006.01)
(Continued)

(52) U.S. Cl.
CPC ............... *E01C 19/236* (2013.01); *E01C 19/26* (2013.01); *E01C 19/282* (2013.01); *E01C 19/288* (2013.01); *E02D 3/026* (2013.01); *G01P 15/00* (2013.01)

(58) Field of Classification Search
USPC ................................. 404/84.1, 117, 128, 130
IPC ............................... E01C 19/28,19/286, 19/288
See application file for complete search history.

(56) References Cited

U.S. PATENT DOCUMENTS 4,546,425 A    10/1985  Breitholtz
5,727,900 A *   3/1998  Sandstrom ................... 404/84.1
(Continued)

FOREIGN PATENT DOCUMENTS

DE           3308476 A1    10/1983
DE      102007000263 A1    11/2008
(Continued)

OTHER PUBLICATIONS

English translation of International Preliminary Report and Written Opinion issued for related application PCT/EP2012/075415 dated Jun. 17, 2014, 8 pages.
(Continued)

*Primary Examiner* — Gary Hartmann
(74) *Attorney, Agent, or Firm* — Rothwell, Figg, Ernst & Manbeck, P.C.

(57) ABSTRACT

A device for detection of the motion of a compactor roller (20) of a soil compactor (10) rotatable about an axis of rotation (A), where said roller comprises on one inside of a roller mantle (22) a plurality of motion sensors (a$_i$) arranged in the circumferential direction around the axis of rotation (A) and at a spacing from each other and moveable with the roller mantle (22) around the axis of rotation (A).

20 Claims, 3 Drawing Sheets

(51) Int. Cl.
*E01C 19/28* (2006.01)
*E01C 19/26* (2006.01)
*G01P 15/00* (2006.01)

(56) References Cited

U.S. PATENT DOCUMENTS

| | | | |
|---|---|---|---|
| 5,797,699 A * | 8/1998 | Blancke et al. | 404/117 |
| 6,769,838 B2 * | 8/2004 | Potts | 404/117 |
| 8,635,903 B2 * | 1/2014 | Oetken et al. | 73/78 |
| 8,671,760 B2 * | 3/2014 | Wallrath et al. | 73/594 |
| 2006/0096354 A1 | 5/2006 | Commuri et al. | |
| 2010/0042298 A1 | 2/2010 | Haruyama et al. | |
| 2010/0215434 A1 | 8/2010 | Wolf | |
| 2015/0101424 A1 * | 4/2015 | Villwock et al. | 73/865.8 |

FOREIGN PATENT DOCUMENTS

| | | | |
|---|---|---|---|
| WO | 9510664 | A1 | 4/1995 |
| WO | 9420684 | A1 | 8/1995 |
| WO | 2008138690 | A1 | 11/2008 |

OTHER PUBLICATIONS

Search Report issued in German Priority Application DE10 2011 088 567.6 dated Oct. 29, 2012, 8 pages.

* cited by examiner

DEVICE FOR DETECTING THE MOTION OF A COMPACTOR ROLLER OF A SOIL COMPACTOR

CROSS REFERENCE TO RELATED APPLICATIONS

This application is a 35 U.S.C. §371 National Phase Entry Application from PCT/EP2012/075415, filed Dec. 13, 2012, claiming priority from German patent application serial number 10 2011 088 567.6, filed Dec. 14, 2011, designating the United States, the disclosure of which is incorporated herein in its entirety by reference.

BACKGROUND OF THE INVENTION

1. Field of the Invention

The present invention relates to a device for detecting the motion of a compactor roller of a soil compactor rotatable about an axis of rotation.

2. Background of the Related Art

Soil compactors used in the compacting of soil structural materials, such as earth, gravel, asphalt or such, are provided with a shaker drive on at least one compactor roller to achieve the desired degree of compacting. By means of this kind of shaker drive, for example, a circumferential shaking, acceleration of the compactor roller can be produced in order to generate an oscillation motion of the compactor roller, that is, a back and forth motion in the circumferential direction. In addition it is possible, by means of a shaker drive, to produce a radial shaking acceleration of the compactor roller and consequently a vibrational motion, that is, a motion in the radial direction with respect to an axis of rotation of the compactor roller.

In order to obtain information about the motion status of the compactor roller in soil, compactors designed in this way, it is known how to provide sensors, such as acceleration sensors or angle sensors, on framework components in the area of a compactor roller. Since these sensors, however, are not motion-linked to the roller whose motion state is to be monitored, but rather to a frame about which the roller rotates, the sensor signals or the information contained in said signals supplied by such sensors can only be conditionally used for an exact determination of the motion state, in particular different vibration modes or motion forms, such as skipping, tumbling or yaw of a compactor roller.

SUMMARY OF THE INVENTION

The object of the present invention is to design a device for detecting the motion of a compactor roller of a soil compactor which allows a precise determination of the motion state of a compactor roller.

According to the invention this object is obtained by means of a device for detecting the motion of a compactor roller of a soil compactor rotatable about an axis of rotation, said roller comprising on the inside of a roller mantle a plurality of motion sensors arranged in the circumferential direction around the axis of rotation and at a spacing from each other and moveable with the roller mantle around the axis of rotation.

With regard to the present invention, it is significant that the sensors used to detect the motion state are moveable together with the roller mantle. Since they are positioned on the inside of the roller mantle, they are shielded against external influences. Nonetheless, the sensors moving with the roller mantle about the axis of rotation experience forces and accelerations which directly correspond to those of the roller mantle itself, and thus provide signals which are more closely correlated with the motion state of the compactor roller than is the case for the motion state of sensors detecting the parts of the frame.

Furthermore, the soil compactor can comprise:

A radio-signal transmission apparatus for transmission to an evaluation unit of motion information based on the motion sensors, and/or An energy converter apparatus to extract electric energy from the compactor roller motion to power the motion sensors and the radio-signal transmission apparatus.

In addition, if a radio-signal transmission apparatus is provided to transmit to an evaluation unit the information from the sensor signals, the rotary leads and corresponding cable connections can be omitted, so that the invented apparatus is more robust and less susceptible to failure, but at the same time is also much easier to build.

In addition, if an energy converter apparatus is provided which extracts energy from the motion of the compactor roller itself and thus powers the sensors firstly, and the radio-signal transmission apparatus secondly, the invented apparatus can operate fully independently in the detection of the motion state of a compactor roller. It is also not necessary to supply the various electric energy consumers, such as motion sensors and radio-signal transmission apparatus, with external electric energy through some kind of line connections.

In order to be able to determine the motion state with the invented device where it is in contact with the material being compacted independently of the momentary rotary position of a compactor roller, it is further proposed to provide at least a group ($G_1$, $G_2$) with at least three, preferably at least four, motion sensors arranged with a circumferential spacing to each other.

Then in order to ensure that the signals supplied by the sensors of a group can be associated with a particular length region of the compactor roller, it is further proposed that the motion sensors of a group are arranged essentially in the same axial region.

Since the end regions of a compactor roller and/or of a roller mantle are of particular importance with respect to the motion status, it is further proposed that a group of motion sensors is arranged in at least one, preferably in both axial end regions of the roller mantle. In particular when a group of motion sensors is arranged in each of the two axial end regions, a conclusion can be drawn about the motion state in a middle region of the roller by comparison of the information supplied from these groups.

The motion sensors of a group preferably can be arranged at equal circumferential spacing to each other, so that the signal evaluation to be conducted under consideration of the signals of all or of several sensors of a group can be implemented in a simple manner or in the same manner for all sensors.

At least a portion of the motion sensors can be designed as acceleration sensors, wherein preferably three-axis acceleration sensors are used to obtain the most precise resolution of the motion status of a compactor roller.

The radio-signal transmission apparatus can comprise one signal transmission unit in association with each motion sensor. Thus a component is produced which can operate independently and be positioned anywhere.

To attain the simplest possible structure, the invention proposes that the radio-signal transmission apparatus comprises a common signal transmission unit for at least two motion sensors, preferably for all motion sensors of a group of motion sensors, and most preferably for all motions sensors. Since according to the invention the signal transmission takes place by radio, the radio-signal transmission apparatus can also be positioned so as to rotate with the roller mantle and thus can be easily linked to several motion sensors by means of line connections without a rotary lead being required.

In addition, if the energy converter apparatus associated with each motion sensor and/or to the radio-signal transmission apparatus or to each signal transmission unit thereof comprises an energy converter unit, then the creation of essentially independently operating units is promoted; such units can still operate, for example, when others can no longer be used due to a defect.

Due to the very simple and low-cost design, it is also proposed that the energy converter apparatus associated with at least two motion sensors and/or with at least two signal transmission units of the radio-signal transmission apparatus, preferably with all motion sensors of a group of motion sensors and/or the signal transmission units associated therewith, and most preferably with all motion sensors and/or signal transmission units, comprises a common energy converter unit.

The invention further relates to a soil compactor with at least one compactor roller and an apparatus associated with at least one compactor roller of an inventively designed apparatus for detecting the motion state of the compactor roller.

In this regard to improve the compacting results, the at least one compactor roller has an associated shaker drive to produce a circumferential shaking acceleration and thus to produce a radial shaking acceleration of the compactor roller and/or to produce a radial shaking acceleration and thus a vibration motion of the compactor roller. It is self-evident that the shaker drive can have different operating units to produce the various motion states.

BRIEF DESCRIPTION OF THE DRAWINGS

The present invention will be described in greater detail below with reference to the attached figures. Shown are.

DETAILED DESCRIPTION

Figure 1:
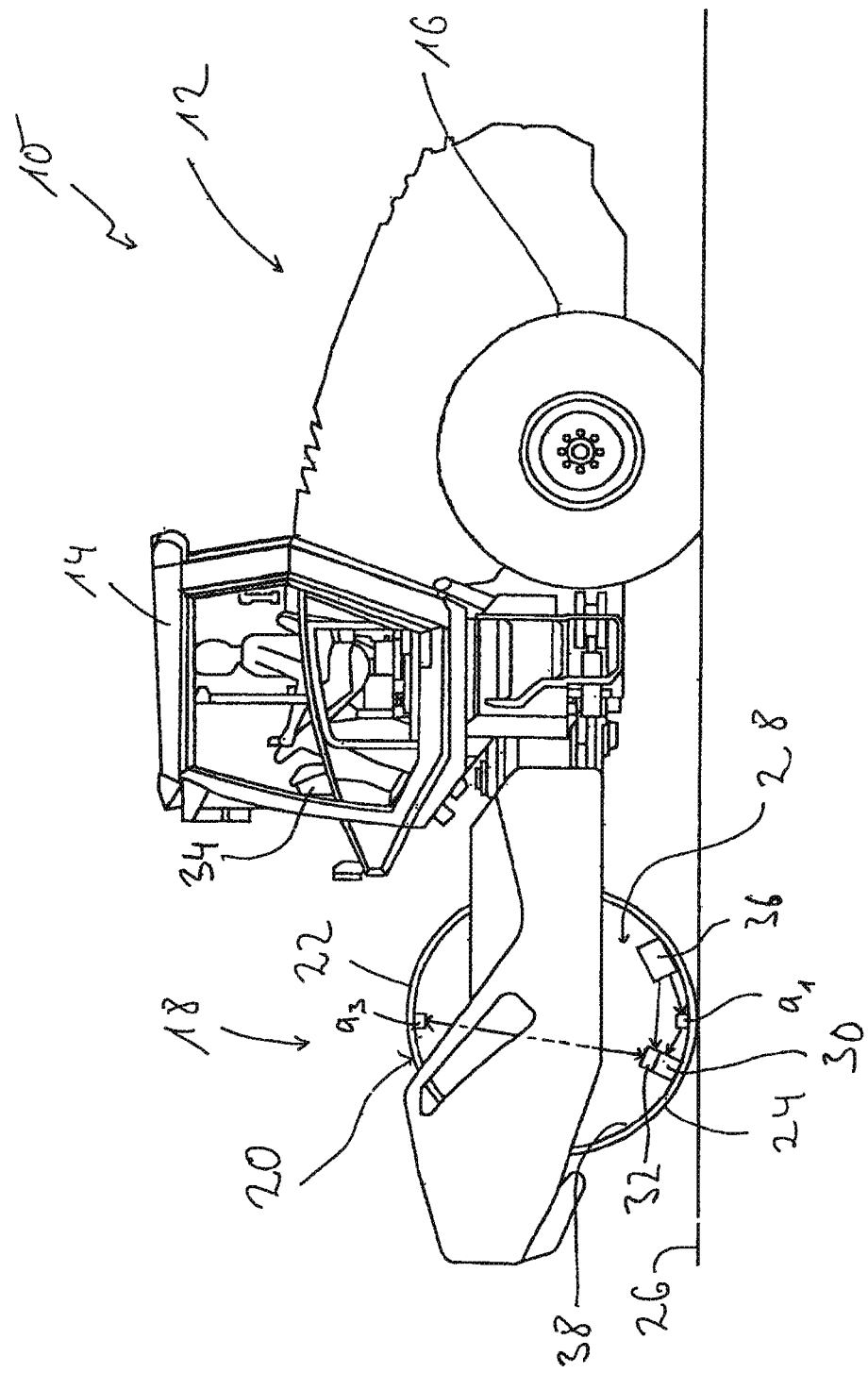
FIG. 1 A side view of a soil compactor used for compacting of soil.

FIG. 1 depicts a simplified, side view of a self-propelled soil compactor 10 employed for compacting of soil. The soil compactor 10 comprises a vehicle region 12 to which a driver's cab 14 is provided, likewise two drive wheels 16 driven by a drive unit (not illustrated). A front vehicle region 18 is connected to the rear vehicle region 12 in an articulated manner; said front region bears a compactor roller 20, generally also called the wheel drum, which rotates about an axis of rotation. The soil 26 being compacted is contacted by the outer circumferential surface 24 of the roller mantle 22.

In general a shaker drive is arranged in the region impacted by the compactor roller 20, in order to affect the compaction result. This shaker drive can bring the compactor roller 20 into various shaking states, depending on its design. When the compactor roller 20 is impacted with a circumferential shaking force, said roller or the roller mantle 22 will perform a back and forth oscillating motion around the axis of rotation of the compactor roller 20. A radial shaking acceleration produces a vibration motion of the roller mantle 22 and/or of the outer perimeter surface 24, that is, a motion in a radial direction. The compacting behavior can also be affected, depending on the material being compacted, by the selection of the particular acceleration to be applied or by overlapping of different acceleration states.

In order to determine the motion state of the compactor roller 20 of the soil compactor 10, in particular where it is in contact with the construction material applied to the subsoil 26 being compacted, the compactor roller 20 has a device 28 which can detect the motion of the compactor roller 20 as it rotates about its axis of rotation.

Figure 2:
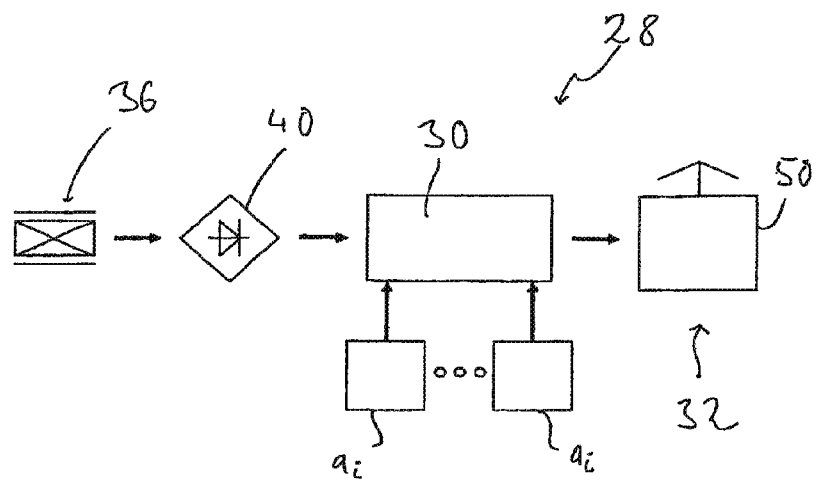
FIG. 2 A fundamental representation of the design of a device for detecting the motion state of the compactor roller of the soil compactor of FIG. 1.

This device 28 is illustrated in FIG. 2 as a fundamental sketch and comprises a plurality of motion sensors $a_i$ which rotate with the roller mantle 22 about the axis of rotation of the compactor roller 20. Preferably these motion sensors $a_i$ are designed as three-axis acceleration sensors which can supply a signal representing the acceleration and/or acceleration components for each of the three possible directions in space x, y and z, or can supply an overall acceleration signal generated by overlapping of these acceleration vectors.

The acceleration sensors transfer their sensor signals to a microcontroller 30. In turn, the microcontroller 30 is connected to a radio-signal transmission apparatus 32, and based on the sensor signals from the motion sensors $a_i$, transmits motion information to an evaluation unit 34, located for example in the region of the driver's cab. Signal- or data processing can occur in this evaluation unit 34 and the person operating the soil compactor 10 can be notified, for example graphically or numerically, about the motion state of the compactor roller 20, or the motion state can be computed by an appropriate algorithm and displayed as a compaction value. In addition, undesirable vibration states of the compactor roller 20 can be prevented by changing the machine control.

In order to provide electric power to the system components requiring it, that is, the motion sensors $a_i$, the microcontroller 30 and the radio-signal transmission apparatus 32 requiring electric energy for operation, an energy converter apparatus 36 is also provided. This energy converter apparatus 36, like the microcontroller 30, the motion sensors $a_i$ and the radio-signal transmission apparatus 32, is arranged on the compactor roller 20, preferably at the inside 38 of the roller mantle 22, and thus can move with the other components of the device 28 about the axis of rotation of the compactor roller 20. The energy converter 36 can obtain electric energy from the motion of the compactor roller 20. In particular the compactor roller 20 can derive an oscillation motion and/or a vibration motion, that is, an alternating back and force motion, due to the already described shaker drive. This motion can be used to convert an oscillating mass of the energy converter apparatus 36 into an oscillating motion and through electromagnetic conversion, or for example through utilization of the piezoelectric effect, electric energy can be obtained. Due to the oscillating motion the polarity of the electric energy generated in the energy converter apparatus 36 will reverse alternately. Thus it can be advantageous to provide a rectifier 40, for example, a bridge rectifier in order to apply a direct voltage to the electrically operating system components.

Depending on whether the compactor roller 20 is to be set into a particular motion state, it can be an advantage to position the energy converter apparatus 36 in a different location.

Figure 3:
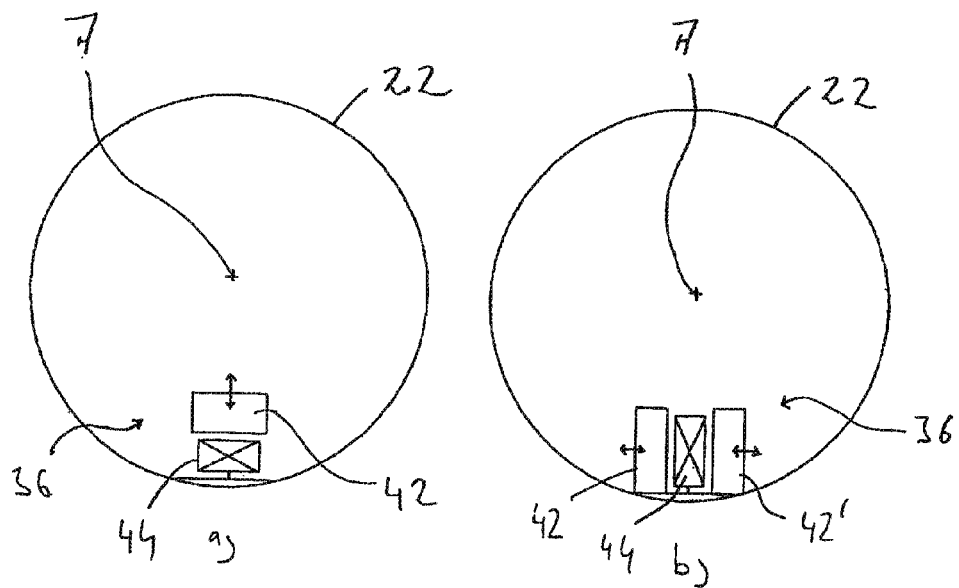
FIG. 3 A fundamental representation of the positions of an energy converter apparatus shown in positions a) and b)

For example, FIG. 3a) shows an energy converter apparatus 36 with an oscillating mass 42 which can be stimulated to perform an oscillating motion; said oscillating mass can perform an essentially radial oscillating motion with respect to the axis of rotation A and with respect to a fixed body region 44 connected to the roller mantle 22. Positioning or orientation of this kind is advantageous, when the compactor roller 20 is primary affected by a radial shaker acceleration and hence is intended to execute a vibration motion.

FIG. 3b) shows an apparatus in which the energy conversion apparatus 36 is positioned so that the oscillating masses 42, 42' provided in pairs here, can execute an essentially circumferential motion or tangential motion with respect to the body region 44, which is an advantage in particular, when the compactor roller 20 and/or the roller mantle 22 thereof is primary impacted to perform an oscillation motion with a circumferential shaker acceleration.

Figure 4:
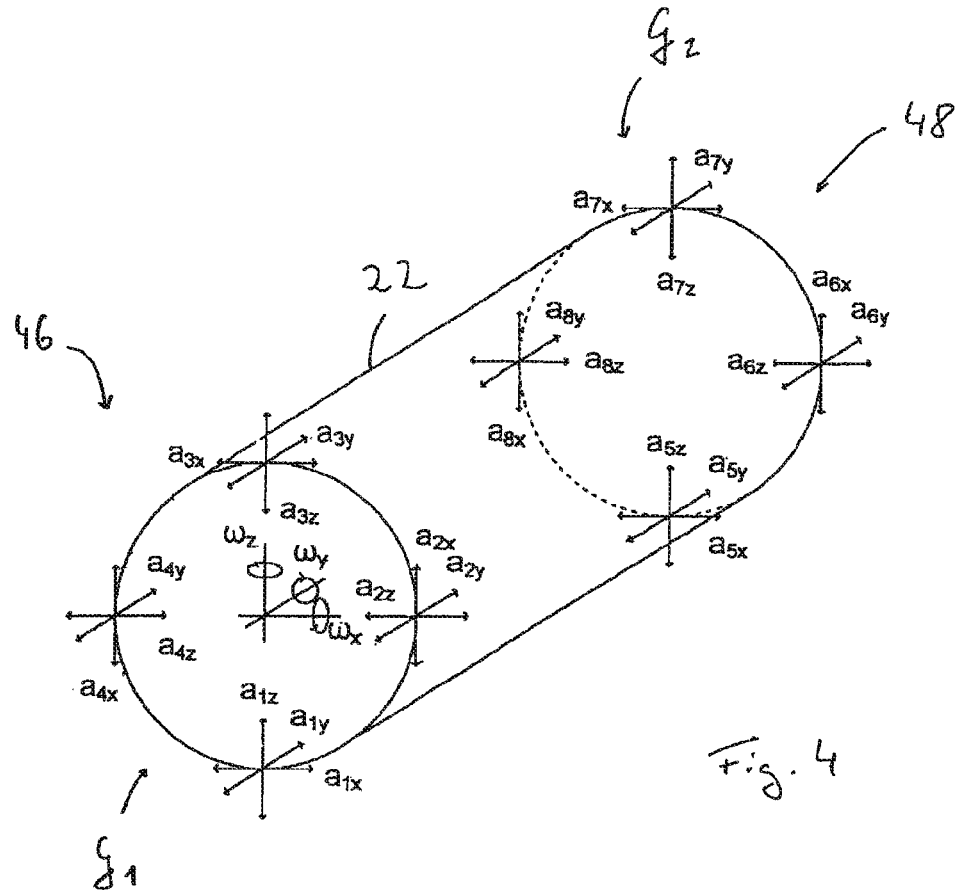
FIG. 4 The positioning of a plurality of three-axis acceleration sensors as associated with a fundamental representation of a roller mantle.

As FIGS. 1 and 4 illustrate, the different motion sensors $a_i$ at the interior circumference 38 of the roller mantle 22 are distributed about the axis of rotation in the circumferential direction. In order to determine exactly the motion state of the compactor roller 20, in particular in its downward region in contact with the compacting subsoil 26, it is advantageous to provide at least a group with three such motion sensors $a_i$, preferably groups with four motion sensors $a_i$ each. This is also illustrated in FIG. 4. There we see the illustrated roller mantle 22, and in each of the two axial end regions 46, 48 thereof, a group $G_1$ or $G_2$ each with four three-axis acceleration sensors $a_1$, $a_2$, $a_3$, $a_4$ (group $G_1$) and $a_5$, $a_6$, $a_7$, $a_8$ (group $G_2$). The sensors $a_i$ provided in the particular group $G_1$ or $G_2$ are arranged at a constant perimeter spacing, thus 90° each. The various motion sensors $a_i$ are oriented here such that the acceleration component x to be detected by them is oriented approximately in the circumferential direction, the acceleration component y is oriented in the direction of the axis of rotation of the compactor roller 20, and the component z is oriented orthogonal to the roller mantle 22, that is, radially with respect to the axis of rotation of the compactor roller 20, wherein a direction on the roller mantle 11 defines a positive z-direction.

Figure 5:
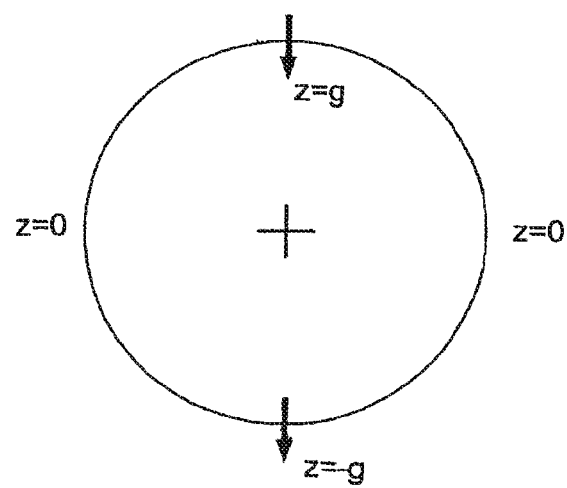
FIG. 5 A fundamental side view of a roller mantle to explain the influence of the acceleration of gravity on the detection of the motion state.

With this kind of arrangement of the different acceleration sensors $a_i$ of the groups $G_1$ and $G_2$ it is possible to determine in each circumferential end region 46, 48 which of the acceleration sensors $a_i$ is positioned downward, that is, in contact with the subsoil being compacted. As illustrated in FIG. 5 for example, due to the constant acceleration of gravity g permanently superimposed on the shaker acceleration, and for example when the acceleration sensor a1 is oriented downward, the z-component of acceleration contains a constant portion of −g superimposed on the shaker acceleration, whereas in this state the acceleration sensor a3 positioned at the maximum away from the subsoil 26, supplies a z-acceleration component signal which is superimposed on the acceleration of gravity with a different sign, here namely as g. In the case of the two acceleration sensors a2 and a4 positioned at the middle height, the z-component does not supply a constant factor resulting from any superimposing on the acceleration of gravity. By determining the constant factors contained in the various sensor signals, in particular the z-component, the positioning of the particular sensors $a_i$ of the various groups $G_1$ or $G_2$ can be determined precisely in the circumferential direction and/or with respect to the subsoil. If none of the sensors is in direct contact with the subsoil 26, that is, none of the sensors is positioned in the lower region, then for each of the acceleration sensors $a_i$ in association with a group $G_1$, $G_2$, the z-acceleration component will have a constant portion different from zero. By taking into account signals supplied from all sensors, it is possible in a simple manner to determine the rotational position of the compactor roller 20 through corresponding angular relationships. For example, if none of the sensors is positioned directly in the lower region, it is possible to determine the motion state in the region in contact with the subsoil 26 by taking into account the two sensors positioned farthest toward the bottom. Also, it is possible to evaluate solely the signal from that particular sensor which is positioned closest to the subsoil 26.

In the manner just described above for determining which of the acceleration sensors $a_i$ of a particular group $G_1$ or $G_2$ is to be used to identify the motion state at the underside for a more precise angular resolution, the signal representing the x-acceleration component could also be taken into account. It is phase-shifted by 90° with respect to the superimposing of the acceleration of gravity on the z-component signal represented in FIG. 5. When taking into consideration both the x-acceleration component, and also the z-acceleration component, a more accurate angular resolution can thus be achieved when determining the position of the acceleration sensors $a_i$ of the particular group in the circumferential direction, and thus also with respect to the subsoil 26.

As was described above with reference to FIG. 3 and to the energy converter apparatus 36, the device 28 can be designed in various ways. For example, a single microcontroller 30 can be in association with all sensors $a_i$, and cooperating with said microcontroller, a radio-signal transmission apparatus 32 can be provided with a single transmission unit 50. All these system components can be supplied with energy from a single energy converter apparatus 36. The movement of sensor signals from all sensors $a_i$ to a single microcontroller 30 affords the possibility to perform the signal processing, in particular also the linkage of different sensor signals right in this microcontroller 30, to perform and then to transfer the processed signals to the evaluation unit 34, for example for display of the processing result. Of course, the microcontroller 30 could also be used merely to transfer the signals from the various sensors $a_i$ in time sequence to the evaluation unit 34 for further signal processing, which means that in the microcontroller 30 itself essentially no signal processing is performed.

In an alternative embodiment, depending on energy requirements, a greater number of energy converter devices 36 could be provided. For example, one energy converter apparatus 36 could be provided for and in association with each of the two groups $G_1$ and $G_2$. If the power requirements are large, an energy converter apparatus 36 could be provided for each sensor $a_i$.

In addition it is possible to vary the number of transmission units 50 of the radio-signal transmission apparatus 32. Here too, for example, one transmission unit 50 can be provided for and in association with each group $G_1$ or $G_2$. Given a corresponding linkage of components, an independently operating transmission unit 50 could be provided for each sensor $a_i$, so that for example component assemblies can also be created which combine a motion sensor $a_i$, a microcontroller 30, a transmission unit 50 and in association with it an energy converter apparatus 36, possibly with rectifier 40.

The provision of electric energy from the energy converter apparatus 36 can take place in different ways, as is illustrated in FIG. 1. As is shown in connection with the sensor a1 positioned downward in FIG. 1, it is possible to supply electric energy to the sensor(s) $a_i$ and the radio-signal transmission apparatus 32 and/or the microcontroller 30, independently of each other. As shown with respect to the top positioned sensor a3, the connection existing between the latter and in particular also the microcontroller 30 can be used as an alternative both for transmission of the sensor signal, and also to supply electric energy, thus in a bidirectional manner.

In addition, the radio-signal transmission apparatus 32 or at least one transmission unit 50 thereof can be used not only for sending of signals to the evaluation unit 34, but rather also for reception of signals. For example, it is thus possible to update the operating program saved in the microcontroller 30 or, if necessary, to perform a parameterizing of various sensors $a_i$, that is for example, a reset of the zero value, a norming or such. The signals or information to be transmitted between the microcontroller 30 and the evaluation unit 34 can be present in analog or also in digital form. In particular, using signals engineering a digital coding allows in a simple manner a differentiation of the information contained in the radio signal and their allocation to the various sensors $a_i$.

In order to acquire additional information for the motion state or the positioning of the compactor roller 20, it is possible to provide one or a plurality of angle sensors $\omega$, also called gyro-elements. By means of one such sensor which is positioned near the axis of rotation, for example, it is also quite possible to determine the rotational speed or to obtain information about the position of the axis of rotation in space. Also, one or a plurality of such angle sensors can be powered with electric energy in the manner described above, analogous to the acceleration sensors, or their detection results or information based thereon can be transferred to the evaluation unit 34 via the microcontroller 30 and the radio-signal transmission apparatus 32.

In addition it should be pointed out that the various system components of the device 28 can be arranged at different regions on the inside of the roller mantle. For the acceleration sensors it is possible to attach them directly to the interior circumferential surface of the roller mantle, in order to detect its motion state in the best possible manner. The energy converter apparatus can also be located preferably at the interior circumferential surface of the roller mantle, in order to make efficient use of its kinetic energy. Provided it is structurally separated from the energy converter apparatus, the radio-signal transmission apparatus can be located at another region, for example, a region near the axis of rotation, or a hub disc region or the like of the compactor roller. Also the energy converter apparatus and/or the sensors or at least a portion thereof could be positioned, for example, at the radial outer region of a hub region designed as disc-like, for example, to support the roller mantle.

The substantial advantage of the invented embodiment of a soil compactor and/or of an apparatus to detect the motion of a compactor roller of a soil compactor is obtained because the sensors used herein, and potentially also the microcontroller, are provided on the compactor roller and move with it. This advantage is obtained regardless of whether a radio-signal transmission apparatus and/or an energy converter apparatus is provided, possibly also with a microcontroller or such to avoid the generally more cumbersome rotary leads which move with the compactor roller. Basically a radio-signal transmission apparatus, however, could be provided on a region of the soil compactor which does not rotate with the compactor roller and be connected via a rotary lead with the various sensors or with one or a plurality of sensors associated thereon. Also an energy source, for example a rechargeable battery, could be provided on a region not rotating with the compactor roller and can be connected to one or a plurality of sensors or with a co-rotating radio-signal transmission apparatus by cable connection by means of a rotary lead. Of course, one such rechargeable energy supply could be provided to move with the compactor roller, and then care must be taken that a connecting cable for recharging can be provided Now where no radio-signal transmission apparatus rotating with the compactor roller is provided and thus the signals are transmitted from the sensors or from the microcontroller over the line connection to the non-rotating region, then a radio signal transmission could basically be omitted and the signal transmission would proceed exclusively through a line connection.

The invention claimed is:

1. A device for detecting the motion of a compactor roller of a soil compactor rotatable about an axis of rotation, said roller comprising on the inside of a roller mantle a plurality of motion sensors arranged in the circumferential direction around the axis of rotation and at a spacing from each other and moveable with the roller mantle around the axis of rotation.

2. The device according to claim 1, further comprising at least one of
   a radio-signal transmission apparatus for transmission to an evaluation unit of motion information based on sensor signals of the motion sensors; and
   an energy converter apparatus to extract electric energy from the compactor roller motion to power the motion sensors and the radio-signal transmission apparatus.

3. The device according to claim 1, wherein at least a group is provided with at least three motion sensors arranged with a circumferential spacing to each other.

4. The device according to claim 3, wherein the motion sensors of a group are arranged essentially in a same axial region.

5. The device according to claim 3, wherein in at least one of axial end regions of the roller mantle a group of motion sensors is arranged.

6. The device according to claim 3, wherein the motion sensors of a group are arranged at equal circumferential spacing to each other.

7. The device according to claim 1, wherein at least a part of the motion sensors is designed as acceleration sensors.

8. The device according to claim 2, wherein the radio-signal transmission apparatus in association with each motion sensor comprises a signal transmission unit.

9. The device according to claim 2, wherein the radio-signal transmission apparatus comprises a common signal transmission unit for at least two motion sensors.

10. The device according to claim 2, wherein the energy converter apparatus in association with each motion sensor and/or to the radio-signal transmission apparatus comprises an energy converter unit.

11. The device according to claim 2, wherein the energy converter apparatus in association with at least two motion sensors and/or to at least two signal transmission units of the radio-signal transmission apparatus comprises a common energy converter unit.

12. A soil compactor, comprising at least one compactor roller and an apparatus associated with at least one compactor roller according to claim 1.

13. The soil compactor according to claim 12, wherein a shaker drive to produce a circumferential shaking acceleration and/or to produce a radial shaking acceleration is associated with the at least one compactor roller.

14. The device according to claim 1, wherein at least a group is provided with four motion sensors arranged with a circumferential spacing to each other.

15. The device according to claim 3, wherein a group of motion sensors is arranged in both axial end regions of the roller mantle.

16. The device according to claim 1, wherein at least a part of the motion sensors is designed as three-axis acceleration sensors.

17. The device according to claim 2, wherein the radio-signal transmission apparatus comprises a common signal transmission unit for all motion sensors of a group of motion sensors.

18. The device according to claim 2, wherein the radio-signal transmission apparatus comprises a common signal transmission unit for all motion sensors.

19. The device according to claim 2, the energy converter apparatus in association with all motion sensors of a group of motion sensors and/or to the signal transmission units associated therewith, comprises a common energy converter unit.

20. The device according to claim 2, the energy converter apparatus in association with all motion sensors and/or signal transmission units, comprises a common energy converter unit.

* * * * *